Aug. 3, 1943.　　　　　C. C. GALL　　　　　2,325,764
MUSICAL DIRECTING DEVICE
Filed Sept. 30, 1939
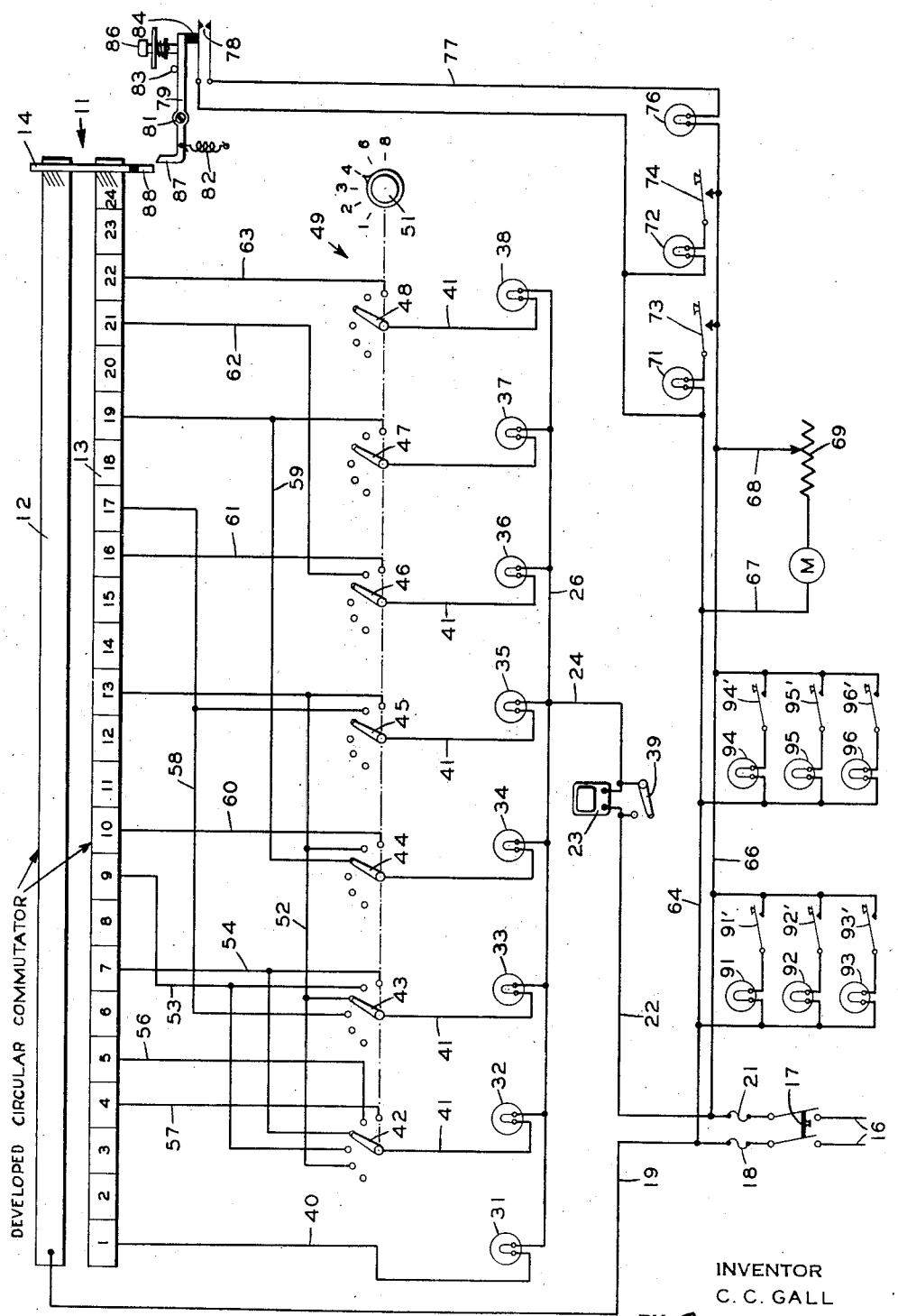
INVENTOR
C. C. GALL
BY Morris R. Marsh
ATTORNEY Patented Aug. 3, 1943

2,325,764

UNITED STATES PATENT OFFICE 2,325,764

MUSICAL DIRECTING DEVICE

Charles C. Gall, Richmond Hill, N. Y.

Application September 30, 1939, Serial No. 297,207

2 Claims. (Cl. 177—311)

This invention relates primarily to apparatus for use in directing groups of musicians and more particularly to apparatus for indicating the tempos or speeds at which various musical selections are to be played, both prior to and during the playing thereof, together with other directions incident to the directing of a group of musicians. While the invention is particularly useful in the directing of groups of student musicians, its use is not limited to students or groups and may be used to advantage by groups of more or less finished musicians and by individuals.

It is oftentimes impractical or inconvenient for a leader of a group of musicians to indicate by movement of a baton, wand or hand the tempo at which a musical selection is to be played, especially where a leader plays a musical instrument or the location or arrangement of the players is such that it is difficult for them all to see and follow the movements of the leader. Also in the playing of certain types of musical selections the tempo or the number of complete measures occurring in a given length of time are often different for different sections of the musical selection. Hence it is desirable that all the musicians be made aware of any change occurring or about to occur in the tempo. Another disadvantage in the present manner of a leader indicating the tempo of musical selections is that prior to the start of the selections, the leader usually indicates the tempo of a measure by movement of the wand and the musicians begin playing at the beginning of the second measure. Unless the musicians are attentive they are not all likely to begin at the proper time which results in improper rendition of the selection and detracts from the enjoyment of an audience. Audible tempo or beat indicators have been provided heretofore wherein an audible sound indicates the tempo, which eliminate some of the above mentioned disadvantages, however, such devices are not always practical as oftentimes the audible signal cannot be heard over the music.

In view of the above it is one of the primary objects of the present invention to provide a device comprising a group of visual signals, such as lamps, which may be operated in various combinations to indicate according to a predetermined plan any one of a plurality of tempos at which various musical selections may be played.

Another object of the invention is to provide devices of the above type which may be readily connected to be controlled from a single source and the individual devices located in most advantageous positions for the benefit of the musicians.

Another object of the invention is to provide an audible signal which may or may not be operated in conjunction with the visual signals.

Depending upon the type of music being played the number of complete measures occurring in a given length of time varies and in view thereof it is still another object of the invention to provide a tempo indicating device capable of indicating measures of widely varying lengths and with different numbers of beats therein.

Still another object of the invention is to provide a tempo indicating device which will indicate the length and/or number of beats in various measures and the tempo at which such measures are to be played.

The tempo in different parts of a musical selection or the number of measures occurring in a given length of time are often different for different sections of the selection. Accordingly it is still another object of the invention to provide a tempo indicator the speed of which may be readily changed from one value to another and in addition a visual signal to indicate the direction in which the tempo is changing or is to be changed, i. e., to indicate whether tempo is to be increased or decreased.

Still another object of the invention in conjunction with the above objects is to provide means for indicating the degree of softness or loudness or modification of tones with which various measures or parts of a musical selection are to be played.

These and other objects of the invention will be apparent hereinafter when taken in conjunction with the drawing and detailed description thereof.

In the invention a group of visual indicators such as lamps are employed and these lamps are illuminated in various combinations to indicate the number of beats in a measure. If, for example, a selection is to be played in 3/4 time, three lamps are successively illuminated one at a time once for each measure. The first lamp illuminated indicating the first beat of a measure, the second lamp illuminated indicating the second beat and the third lamp the third beat, the illumination of the three lamps being repeated for each measure. Similarly, if a selection is to be played in 6/8 time, six lamps will be successively illuminated one at a time once for each measure. The illuminating of the various lamps is timed by a distributor and by varying the speed of a motor employed to drive the distributor by suitable speed control means the number of times a group of lamps are illuminated in a given length of time may be easily varied. A multiple positionable switch determines the number of lamps illuminated in a group or combination which as stated determines the number of beats in a measure.

In the drawing a distributor mechanism of the well known type is indicated in general by reference numeral 11 which comprises a solid ring 12 and a segmented ring 13 with individual segments numbered 1 to 24. The rings 12 and 13 are shown developed for the sake of simplicity of the drawing. However, in the preferred embodiment of the invention the rings 12 and 13 are arranged in concentric circles so that a rotatable brush 14, driven in the well known manner from a motor M hereinafter described, may bridge the rings 12 and 13 and in doing so establish a path for electrical circuits between the segments of the segmented ring 13 and the solid ring 12. As is the usual practice, the brush 14 is arranged to contact only one of the segments of the segmented ring 13 at a time, and therefore only one of the segments at a time has an electrical connection with the solid ring 12. The distributor mechanism 11 is employed to time the various operations of the invention with respect to one another as will be hereinafter pointed out.

The electrical circuits between the distributor mechanism 11 and the various other elements of the invention will now be described. Potential at 16 of suitable value, dependent upon the characteristics of the elements of invention, is applied to the terminals of a switch 17. In the preferred embodiment the potential at 16 is 110 volts A. C., the elements of the invention being suitably adapted to respond to such potential. However, by obvious changes various other potentials could be applied at 16. The left hand terminal of the switch 17 is connected through a fuse 18 and over a conductor 19 to the solid ring 12. Hence, with the switch 17 in a closed position potential is applied to the solid ring 12. The right hand terminal of the switch 17 is connected through a fuse 21 and over a conductor 22 to the left hand terminal of an audible signalling device indicated at 23. The right hand terminal of the audible signaling device 23 is connected by a conductor 24 to a buss bar 26 to which is connected the right hand terminals of visual tempo or beat indicators such as lamps 31 to 38. In the preferred embodiment of the invention there are eight visual beat indicators or lamps 31 to 38, however, the number could be increased or decreased to suit variable operating conditions as hereinafter apparent. A switch 39 is connected around the audible signaling device 23, and with the switch in a closed position the audible signaling device 23 is shunted out of the circuit between conductors 22 and 24.

The left hand terminal of the lamp 31 is connected by a conductor 40 to the segment numbered 1 of the segmented ring 13 and the left hand terminals of the lamps 32 to 38 are connected by individual conductors such as 41 to individual arms 42 to 48 of a multiple level or gang switch indicated in general by reference numeral 49. The gang switch 49 is of the well known type and the arms 42 to 48 thereof are all rigidly connected together for synchronous movement, a button 51 also being connected thereto to indicate the various operated positions of the arms 42 to 48. When eight lamps such as 31 to 38 are employed, the gang switch 49 has seven levels and each arm 42 to 48 thereof is adapted to make contact with any one of six terminals or contacts. Some of the terminals of the various levels of the gang switch 49 have no connections thereto and obviously when the associated arm is contacting such terminals the circuit to the associated ones of the lamps 31 to 38 is broken thereat. The circuits to the various terminals of the gang switch 49 will now be described, and in the description thereof the numbers of the terminals of each level are considered to be from left to right. Likewise the numbers of the various levels are considered to be from left to right.

The first terminal on each of the seven levels of the gang switch 49 have no connection thereto and obviously when the button 51 is in a number 1 position all the circuits to the lamps 32 to 38 are open at the gang switch 49. The second terminal of the first level is connected by a conductor 52 to the segment numbered 13 of the segmented ring 13. The fourth terminal of the second level, the fifth terminal of the third level and the sixth terminal of the fourth level are also connected by conductor 52 in parallel with the second terminal of the first level to the segment 13. The third terminal of the first level and the fifth terminal of the second level are connected in parallel by a conductor 53 to the segment numbered 9 of the segmented ring 13. The fourth terminal of the first level or the level associated with the arm 42 and the sixth terminal of the second level or the level associated with the arm 43 are connected in parallel by a conductor 54 to the segment numbered 7 of the segmented ring. The fifth and sixth terminals of the first level are connected by individual conductors 56 and 57, respectively, to the segments numbered 5 and 4, respectively, of the segmented ring 13. The third terminal of the second level, together with the fifth terminal of the fourth level are connected in parallel by a conductor 68 to the segment numbered 17 of the segmented ring. The fourth and sixth terminals of the third and sixth levels, respectively, are connected in parallel by a conductor 59 to the segment numbered 19 of the segmented ring 13. Segments numbered 10 and 16 of the ring 13 are connected by individual conductors 60 and 61 respectively, to the sixth terminals of the third and fifth levels. The fifth and sixth terminals of the fifth and seventh levels, respectively, are connected by individual conductors 62 and 63, respectively, to segments numbered 21 and 22, respectively, of the ring 13.

It will be noted that various segments of the segmented ring 13 have no connections thereto. The reasons for this will be obvious hereinafter.

From a study of the above circuits it will be obvious that for various settings of the arms 42 to 48 of the gang switch 49, combinations or groups of various numbers of the lamps 32 to 38 are connected to segments of the segmented ring 13. Hence, for these various settings, various combinations of the lamps 31 to 38 have potential applied thereto as the brush 14 passes over the rings 12 and 13. The application of potential to the lamps 31 to 38 causes the illumination thereof and the purpose for causing the illumination of the lamps in various combinations or groups will hereinafter be described, it being obvious that a lamp is illuminated during the interval the brush 14 is in contact with the associated segment.

Two conductors 64 and 66 are tapped to the conductors 19 and 22 respectively and as the conductors 19 and 22 have potential applied thereto the conductors 64 and 66 will have potential thereon. Connected to the conductors 64 and 66 by conductors 67 and 68 respectively is the hereinbefore mentioned motor M in series with a variable resistance or rheostat 69. The variable resistance 69 is such that by changing the setting thereof the speed of the motor M may be varied over comparatively wide ranges. Also connected between the conductors 64 and 66 are two lamps 71 and 72 in series with associated switches 73 and 74 respectively. The switches 73 and 74 in series with the lamps 71 and 72 are normally open and preferably of the push button type which maintain circuits therethrough as long as the buttons are held operated. The right hand end of the conductor 66 terminates at the left hand terminal of a lamp 76 and the right hand terminal of the lamp 76 is connected by a conductor 77 to a spring of a normally open contact 78. The other spring of the contact 78 has the right hand end of the conductor 64 terminated thereat.

Associated with the contact 78 is a lever 79 pivotally mounted adjacent its center on a pivot 81. A spring 82 attached to the lever 79 normally tends to pivot the same in a counter-clockwise direction to normally hold it against a stop 83. The right hand end of the lever 79 has an insulating member 84 attached to the underside thereof in operative relation with the upper one of the springs of the contact 78. A push button 86 associated with the upper side of the right hand end of the lever 79 is adapted when operated to pivot the lever 79 a slight amount in a clockwise direction. Such pivoting of the lever 79 causes the insulating member 84 to close the normally open contact 78 and simultaneously places a vertical projection 87 at the left hand end of the lever 79 in the path of a projection or section 88 of the brush 14, which is insulatively separated from the brush elements. Thus when the push button 86 is in an operated position, the contact 78 is closed and the projection 87 is in the path of the brush 14 to stop further movement thereof when the section 88 engages the projection 87. As is the usual practice the brush 14 has a friction clutch, not shown, interposed between it and the driving means or motor M so as to permit stopping the brush 14 independently of the motor. As the speed of the motor M employed to drive the brush 14 may be varied by changing the setting of the variable resistance 69, the speed of the brush and the number of revolutions thereof in a given length of time may also be varied. The speed of the motor M is arranged so as to be variable within predetermined limits suitable for the operation of the invention as will be hereinafter apparent.

In the preferred embodiment of the invention two groups of three lamps each are employed to indicate the various degrees of loudness, softness or intensity with which particular parts of the musical selection are to be played. As shown in the drawing, a group comprising lamps 91, 92 and 93 are connected in series with normally open associated switches or keys 91', 92' and 93', respectively, to the conductors 64 and 66 so that when any of the keys are closed the associated lamp is illuminated. Likewise, a second group comprising lamps 94, 95 and 96 are connected in series with associated normally open keys 94', 95' and 96', respectively, to the conductors 64 and 66. The reason for arranging the lamps in groups will be hereinafter apparent. If the group comprising lamps 91, 92 and 93 are those to indicate softness, then lamp 91 may indicate soft, 92 medium or moderately soft and 93 very soft. Similarly, lamp 94 of the other group may indicate loud, 95 moderately loud and 96 very loud. Thus by operating the various keys 91' to 96' various ones of the lamps 91 to 96 may be illuminated to indicate modifications in tones or the degree of loudness or softness with which various sections or parts are to be played. The keys 91' to 96' are preferably of the type that remain in either of their open or closed positions so that when actuated into one condition, the position thereof remains unchanged until actuated into the other condition.

The various push buttons, switches, etc., are provided for controlling the invention and the operation of the invention in accordance with the various controls will now be described. Let it be assumed that the switch 17 is closed which supplies potential to the motor M and various points over the above described circuits whereupon the brush 14 rotates over the rings 12 and 13. Let it further be assumed it is desired to indicate the tempo of a musical selection to be played in 4/4 time with a predetermined number of measures per minute. Accordingly, the variable resistance 69 is adjusted so that the brush 14 makes the same number of revolutions per minute as there are measures per minute in the selection to be played. For convenience the variable resistance 69 may be calculated to indicate directly the measures per minute. The next operation is to position the gang switch 49 so that the various arms 42 to 48 thereof are in contact with the fourth terminal of their associated levels, such a position being indicated by the button 51. In the drawing the various arms of the gang switch 49 are shown on the fourth contact of the various levels. The indicating button 51 of the gang switch 49 preferably has the various operated positions thereof designated, as shown, by numerals 1 to 4, 6 and 8. With such an arrangement each switch position indicates directly the number of beats in a measure.

The next operation is to depress the push button 86 which, as described, closes the contact 78 and simultaneously places the end 87 of the lever 79 in the path of the projection 88 on the brush 14. The closing of the contact 78 completes, over the above described conductors a circuit to the lamp 76 which may be called an attention-start-stop lamp. As described hereinbefore, placing the end 87 of the lever 79 in the path of the section 88 of the brush 14 causes the brush to stop on engagement of the two members. It will be observed that with the brush stopped in this position none of the circuits to the lamps 31 and 30 are completed and hence none of the lamps will be illuminated.

The illumination of the attention lamp 76 by the depressing of the push button 86 calls to the attention of the various players that the playing of a musical selection is about to begin. When the attention of all the players is attracted the button 86 is released, whereupon the lamp 76 goes out and the brush 14 is released to rotate over the rings 12 and 13. When the brush 14 is released, it leaves the open segment numbered 24 and next contacts segment numbered 1 to complete a circuit through lamp 31 to cause the illumination thereof. With the gang switch 49 in the position shown, circuits to the lamps 32, 33 and 34 are completed to cause the illumination of the same as the brush 14 subsequently and successively contacts segments numbered 7, 13 and 19, respectively. Similarly for each succeeding revolution of the brush the four lamps 31 to 34 will be illuminated once for each revolution and after a predetermined number of revolutions of the brush, usually one, indicating one full measure, the players begin playing. The number of revolutions of the brush 14, which may be any predetermined number, such as one, two or three, before the musicians begin playing indicates the tempo at which the selection is to be played. The audible signaling device 23 is in a circuit common to all the lamps 31 to 38 and as the four lamps 31 to 34 are sequentially illuminated as above described, the audible signal device 23 is operated in substantial synchronism with the illumination of the individual lamps. If for some reason the audible signal is not desired the switch 39 is closed to shunt out the audible signaling device 23.

The above paragraph described the operation of the invention when employed for indicating the tempo of a musical selection which is to be played in 4/4 time. By changing the position of the button 51 and the arms 42 to 48 of the gang switch 49, various other tempos may be indicated, the number of beats in a measure being indicated by the number of the lamps 31 to 38 illuminated in one revolution of the brush 14. By placing the arms 42 to 48 of the gang switch in their fifth position so as to contact the fifth terminal of their associated levels, the six lamps 31 and 36 will be successively illuminated during each revolution of the brush 14 to indicate a measure wherein there are six beats. Similarly by placing the arms 42 to 48 on their sixth terminal all eight of the lamps 31 to 38 will be successively illuminated during each revolution of the brush 14 to indicate a measure wherein there are eight beats.

It will be noted that the various segments of the segmented ring 13 are connected through the gang switch 49 in such a manner that whatever the number of lamps to be illuminated in one revolution of the brush 14 they are always illuminated with the same time interval occurring therebetween. For example, if the first three lamps 31, 32 and 33 are to be successively illuminated to indicate a measure with three beats therein, the connections to the gang switch 49 and the segments of the segmented ring 13 are such that the lamp 31 is illuminated when the brush contacts segment number 1, the lamp 32 illuminated with the brush contacts segment numbered 9 and the lamp 33 illuminated when the brush contacts segment numbered 17. Thus with only three lamps being illuminated in one revolution of the brush 14, it passes over seven dead segments between the illumination of each lamp. Also the elapse of time between the illumination of the last lamp 33 in such a group and the illumination of the first lamp 31 is equal to the time interval between the illumination of any of the other consecutive lamps. Regardless of the number of the lamps 31 to 38 illuminated on one revolution of the brush 14, the time interval between the illuminating of any two consecutive lamps is always the same and equal to the time interval between the illumination of the last lamp of a group and the first one 31.

From the above it is obvious that the number of the lamps 31 to 38 illuminated on one revolution of the brush indicate the number of beats in a measure and the frequency of the illumination of the individual lamps indicate the speed at which the beats occur.

If during the playing of the musical selection the tempo is to be changed, this is accomplished by varying the adjustment of the variable resistance 69 which changes the speed of the motor M and consequently the speed of the brush 14. The push buttons 73 and 74 together with their associated lamps 71 and 72 are provided in order to indicate to the players the time and direction in which a change in tempo is to be made. If for example the lamp 71 is called a slow-down lamp, the push button 73 is operated prior to and/or during the adjustment of the variable resistance 69 in such a direction as to slow down the motor M. Similarly if the lamp 72 is called a speed-up lamp, the button 74 is operated prior to and/or during the operation of the variable resistance 69 to increase the speed of motor M. Likewise operation of any one of the keys 91' to 96' indicate the degree of softness or loudness at which parts should be played. Thus the players are aware prior to and/or during a change in the tempo and/or a change in the loudness or softness at which a particular section is to be played. When the lamps 31 to 38 are indicating the last measure of a selection, the button 86 is operated which causes illumination of the so-called attention start-stop lamp to inform the players that they are to cease playing at the end of the present measure. The operation of the push button 86 also causes the brush 14 to be stopped on the completion of the current revolution with none of the lamps 31 to 38 illuminated. The above sequence of operating the various controls and switches is merely for the purpose of illustrating the operation of the invention and the particular order of their operation may be changed to meet various operating conditions.

Thus in accordance with the invention various numbers or groups of lamps such as 31 to 38 may be successively illuminated to indicate the number of beats in a measure, with the frequency of the illumination of the individual lamps indicating the frequency of the beats and lamps such as 71 and 72 employed to indicate a change in the tempo while a lamp such as 76 indicates the starting and stopping of a musical selection.

The lamps 31 to 38, 71, 72, 76, and 91 to 96 comprising one group may be connected by well known methods with other similar groups of lamps and each group placed where they may be most advantageously viewed by the various players and not an audience. Thus all the players would not have to look at the same group of lamps and in fact the number of groups could be increased so that each player had their individual group. All the groups of lamps could be controlled by a single distributor such as 11 with the one set of controls and therefore all the groups of lamps would operate in synchronism with one another. All the controls which are manually operated are preferably located in a central position so that they are readily accessible to the operator whereas the various indicating devices such as lamps and audio signal 23 may be located in positions most convenient to the players. Preferably the various types of lamps are of different colors, such as having the tempo indicating lamps 31 to 38 some color such as white, the slow-down lamp 71 some other color such as orange, the speed-up lamp green, and the attention start-stop lamp red, it being obvious that any arrangement of colors may be employed or if preferred, all the lamps may be of the same color. It is also preferred to have the beat-indicating lamps 31 to 38 arranged in one horizontal row with the other lamps 71, 72, and 76 located in such a position as not to be confused therewith.

It will also be obvious that various modifications of the invention may be made without departing from the spirit or essential attributes thereof, and it is desired therefore that only such limitations be placed thereon as are imposed by the prior art or are specifically set forth in the appended claims.

What is claimed is:

1. In a musical tempo indicating device of the type described, a plurality of visual beat indicating devices, a cyclically operable distributor mechanism adapted to make one cycle of operation in each musical measure, a multiple level switch having a movable contacting arm for each level interposed between said distributor mechanism and predetermined ones of said visual indicating devices, means including said switch for selecting as many consecutive ones of said visual indicating devices for operation as there are beats in the musical measures the tempos of which are to be indicated, and means including said distributor mechanism for operating said selected visual indicating devices one at a time and in consecutive order to indicate the beats of said measures.

2. In a cyclically operable musical tempo indicating device of the type described, a plurality of visual signaling elements arranged in a row, a cyclically operable distributor mechanism comprising a plurality of segments and a member adapted to successively and individually apply potential to said segments, a connection from a predetermined one of said segments through a predetermined one of said signaling elements to opposite potential, a single switch having an individual arm connected to each of the others of said signaling elements, said arms being simultaneously movable and each having a plurality of associated contacts connected to said segments in a predetermined manner, means including said switch for selecting for operation with said predetermined signaling element during each cycle of operation of said distributor mechanism various other consecutive ones of said signaling elements, and means including said distributor mechanism and the arrangement of the connections between said segments and said arm contacts for individually operating the predetermined one of said signaling elements and the selected ones of the others in consecutive order with a uniform time interval between the operation of each two consecutive signaling elements.

CHARLES C. GALL.